United States Patent [19]

Murakami et al.

[11] Patent Number: 5,134,689
[45] Date of Patent: Jul. 28, 1992

[54] COORDINATE INPUT SYSTEM AND INPUT IMPLEMENT USED IN THE SYSTEM

[75] Inventors: Azuma Murakami; Tsuguya Yamanami; Takahiko Funahashi; Toshiaki Senda; Toshihide Chikami, all of Saitama, Japan

[73] Assignee: Wacom Co., Ltd., Saitama, Japan

[21] Appl. No.: 235,588

[22] Filed: Aug. 24, 1988

[30] Foreign Application Priority Data

Aug. 24, 1987 [JP] Japan .................. 62-208293
Feb. 29, 1988 [JP] Japan .................. 63-26216[U]
Feb. 29, 1988 [JP] Japan .................. 63-46740

[51] Int. Cl.⁵ .......................... G06F 3/033
[52] U.S. Cl. .................. 395/143; 395/162; 178/19
[58] Field of Search ........... 364/520; 340/706–708; 178/19, 18; 395/143, 162; 73/722

[56] References Cited

U.S. PATENT DOCUMENTS

| | | | |
|---|---|---|---|
| 4,617,515 | 10/1986 | Taguchi et al. | 178/19 |
| 4,660,568 | 4/1987 | Cosman | 73/722 X |
| 4,672,154 | 6/1987 | Rodgers et al. | 178/19 |
| 4,694,124 | 9/1987 | Blesser | 178/19 |
| 4,717,793 | 1/1988 | Kobayashi | 178/19 X |
| 4,734,546 | 3/1988 | Landmeier | 178/19 |
| 4,786,764 | 11/1988 | Padula et al. | 178/19 X |
| 4,786,765 | 11/1988 | Yamanami et al. | 178/19 |
| 4,848,496 | 7/1989 | Murakami et al. | 178/19 |
| 4,859,813 | 8/1989 | Rockwell | 178/18 |
| 4,878,553 | 11/1989 | Yamanami et al. | 178/18 |
| 4,902,858 | 2/1990 | Yamanami et al. | 178/19 |

FOREIGN PATENT DOCUMENTS

| | | |
|---|---|---|
| 47-67704 | 6/1972 | Japan . |
| 49-11432 | 1/1974 | Japan . |
| 57116883 | 1/1979 | Japan . |
| 56-129871 | 8/1981 | Japan . |
| 56-150086 | 10/1981 | Japan . |
| 57-57449 | 4/1982 | Japan . |
| 58-180303 | 11/1983 | Japan . |
| 61-8809 | 1/1986 | Japan . |

Primary Examiner—Gary V. Harkcom
Assistant Examiner—Mark K. Zimmerman
Attorney, Agent, or Firm—Lowe, Price, LeBlanc & Becker

[57] ABSTRACT

A coordinate input system has a tablet composed of an X-direction loop coil assembly and a Y-direction loop coil assembly, and an input pen having a tuning circuit the tuning frequency of which is variable about a predetermined frequency. The system has a coordinate detecting function for detecting the X- and Y-coordinate values of position input by the input pen, and a phase detecting function for detecting the change in the tuning frequency of the tuning circuit as a change in the phase with respect to the phase of the predetermined tuning frequency. Information concerning the detected coordinate point, e.g., spread of the coordinate point proportional to the pressure at which the pen is pressed onto the tablet, is computed in accordance with the amount of change in the phase detected by the phase detecting function.

30 Claims, 10 Drawing Sheets

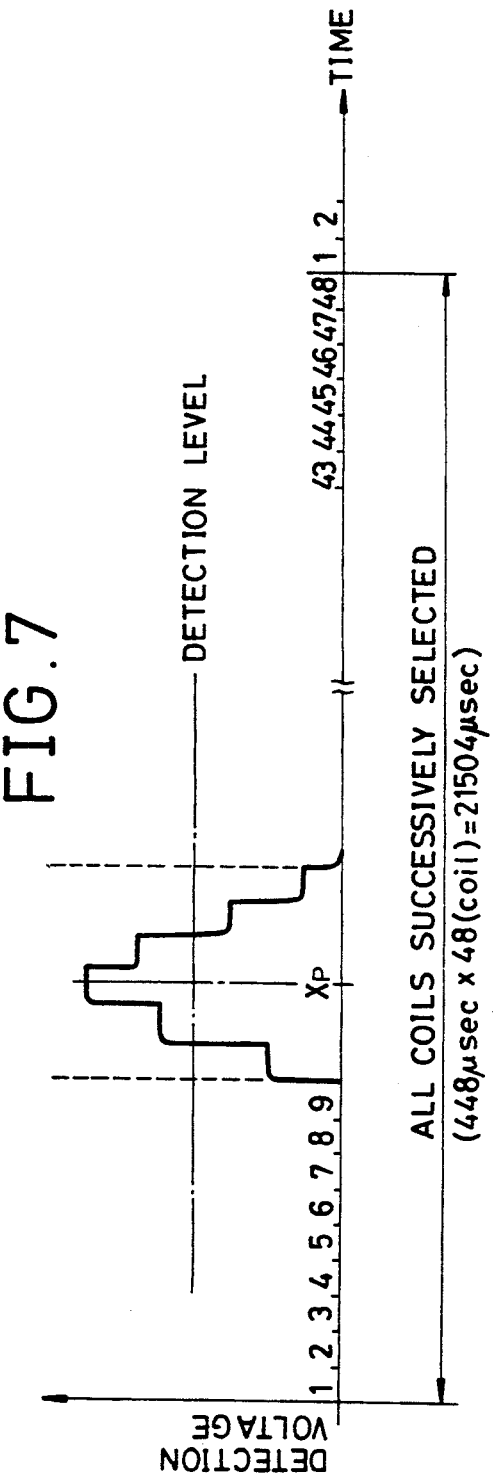
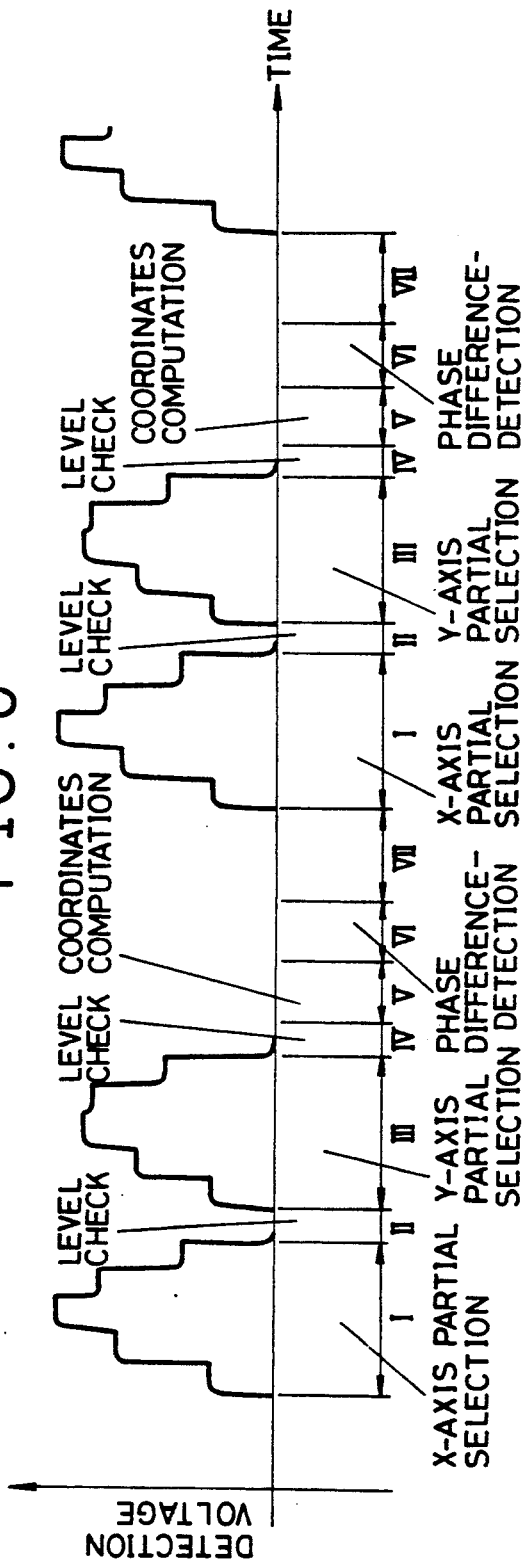

COORDINATE INPUT SYSTEM AND INPUT IMPLEMENT USED IN THE SYSTEM

BACKGROUND OF THE INVENTION

1. Field of the Invention

The present invention relates to a coordinate input system and, more particularly, to a coordinate input system which is capable of providing various types of information such as information for varying the size of a coordinate point in accordance with the level of the force applied to an input pen, i.e., the pressure of contact between the input pen and a tablet. The invention also is concerned with an input pen suitable for use in this system.

2. Prior Art and Its Problem

A conventional coordinate input system of the type described has a pressure sensor provided on the input pen or a multiplicity of pressure sensor elements dispersed on the entire area of the input region of a tablet. The pressure sensor is capable of sensing and detecting the "stylus pressure", i.e., the pressure at which the input pen contacts the tablet, and varies the size of the coordinate point in accordance with the pressure detected.

The arrangement having a multiplicity of pressure sensor elements encounters difficulty in obtaining and maintaining uniform pressure sensing characteristics over the entire area of the input region, with the result that the contact pressure of the input cannot be uniformly and correctly detected over the entire area of the input region of the tablet. The arrangement which relies upon the pressure sensor provided on the input pen requires a cable or other suitable means for picking up the pressure sensing information from the input pen, resulting in an inferior maneuverability of the input pen during inputting.

SUMMARY OF THE INVENTION

Accordingly, an object of the present invention is to provide a coordinate input system which does not necessitate any cable or other means to be connected to the input pen and which is capable of providing various types of information such as information for accurately varying the size of the coordinate point in accordance with the contact pressure of the input pen.

To this end, according to a first aspect of the present invention, there is provided a coordinate input system comprising: a tablet composed of an X-direction loop coil assembly having a multiplicity of loop coils arranged in a side-by-side fashion in the X-direction, and a Y-direction loop coil assembly having a multiplicity of loop coils arranged in a side-by-side fashion in the Y-direction; an input pen having a tuning circuit including at least a coil and a capacitor, said input pen being designed such that the tuning frequency of said tuning circuit is varied around a predetermined central frequency in accordance with the pressure with which the input pen contacts the tablet; X-direction selection means for selecting one of the loop coils of said X-direction loop coil assembly; Y-direction selection means for selecting one of the loop coils of said X-direction loop coil assembly; signal generating means for generating an A.C. signal of a frequency equal to said predetermined frequency; signal detection means for detecting the A.C. signal of said predetermined frequency; connection change-over means for alternately connecting said signal generating means and said signal detection means successively to said loop coils of X- and Y-direction loop coil assemblies selected by said X- and Y-direction selection means; coordinate detection means for determining the X- and Y-coordinate values of the point designated by said input pen in accordance with the A.C. signals detected from said X- and Y-direction loop coils by said signal detection means; phase detection means for detecting, as a change in the phase with respect to the phase of the tuning frequency, the change in the tuning frequency of said tuning circuit of said input pen in accordance with the A.C. signals detected by said signal detection means; and information computing means for computing information such as information concerning the spread of the coordinate point proportional to the pressure of the input pen.

In operation, the signal generating means is connected to one of the loop coils of the X-direction loop coil assembly of the tablet through the connection change-over means so that an A.C. signal of a predetermined frequency is applied to the selected loop coil. In consequence, an electric wave is generated by the selected loop coil and the thus generated electric wave excites the coil of the tuning circuit in the input pen so as to induce a voltage of a predetermined frequency in the tuning circuit.

Thereafter, the connection change-over means disconnects the signal generating means from the selected loop coil and, instead, the signal detection means is connected to the loop coil. In this state, the loop coil does not produce any electric wave but the coil of the tuning circuit generates an electric wave in accordance with the voltage induced in the tuning circuit. The thus generated electric wave excites the loop coil so as to generate an A.C. signal, i.e., an induction voltage, in the loop coil.

The transmission and receiving of the electric wave explained above are performed on all the loop coils of the X-direction loop coil assembly and the Y-direction loop coil assembly by the X- and Y-direction selection means and connection change-over means, and the induction voltages are detected by the signal detection means. The voltage values of the induction voltages depend on the distances between the respective loop coils and the coil of the tuning circuit, i.e., the distances between the respective loop coils and the input pen. It is therefore possible to determine the X- and Y-coordinate values of a point designated by the input pen, on the basis of the voltage values of the induced voltages.

The induced voltage has a frequency offset and a phase offset which correspond to the pressure with which the input pen is pressed onto the tablet. The phase offset is detected by the phase detection means and the thus detected phase offset is delivered to the information computing means which computes information such as information concerning the spread of the point proportional to the pen pressure.

Thus, the coordinate input system according to the first aspect of the present invention enables the size of the coordinate point simply by varying the pressure with which the pen is pressed against the tablet. It is therefore possible to write, for example, letters having varying line portions by manipulating the input pen with varying pressure in the same manner as an ordinary pen. In addition, since the pen pressure is detected through the detection of a change in the tuning frequency of a tuning circuit, it is not necessary to employ a multiplicity of pressure sensing elements dispersed over the entire area of the input region of the tablet and, in addition, the size of the coordinate point, i.e., the spread of the point, can be exactly changed anywhere in the input region on the tablet in accordance with the pressure with which the input pen is pressed against the tablet. The tuning circuit in the input pen is composed mainly of a coil and a capacitor, so that any cable to be connected to the input pen, as well as heavy parts such as batteries and magnet on the input pen, can be dispensed with, thus ensuring good maneuverability of the input pen. In addition, it is possible to design the tablet to have a greater size by virtue of the fact that it need not have any means for detecting the contact pressure. Furthermore, the precision of detection of the coordinate values can be improved by enhancing the accuracy of the arithmetic operation which is conducted on the induction voltage by the computing means.

A second object of the present invention is to provide an input pen for use in a coordinate input system, capable of providing information exactly corresponding to the pen contact pressure without requiring any cable or the like means connected thereto.

To this end, according to a second aspect of the present invention, there is provided an input pen for a coordinate input system, comprising: a stem; a core received in said stem and slightly displaceable and resettable in the axial direction of said stem; a coil movably receiving said core; a capacitor connected to said coil; and a ferrite tip provided on a portion of said core corresponding to an end of said coil.

In use, the user writes letters or other information on the tablet of a coordinate input system while pressing the input pen with varying pressure against the tablet. In consequence, the core is axially displaced in accordance with the pressure with the result that the magnetic permeability and, hence, the inductance of the coil are varied in accordance with the displacement of the core. In consequence, the tuning frequency of the tuning circuit, composed of the coil and the capacitor, is slightly changed to cause a change in the phase and frequency of the voltage which is induced in response to the electric wave transmitted from the coordinate input system. The change in the phase and frequency of the induction voltage causes changes in the phase and frequency of the electric wave which is produced by the coil of the tuning circuit and such changes are received and processed on the coordinate input system whereby information concerning the displacement of the core, i.e., the pressure at which the input pen is pressed against the tablet, can be detected on the coordinate input system.

Thus, in the second aspect of the present invention, the tuning frequency of the tuning circuit of the input pen, constituted by a coil and a capacitor, is changed as a result of a change in the inductance of the coil which in turn is caused by an axial displacement of the core. This input pen can conveniently be used in a coordinate input system in which a position is detected through transmission and receiving of an electric wave from and by a tablet, while making it possible to pick-up the change in the tuning frequency, i.e., information concerning the pressure with which the input pen is held in contact with the tablet. In addition, it is possible to eliminate the necessity for a cable or the like means which would electrically connect the input pen to the stationary part of the coordinate input system such as the tablet. The change in the tuning frequency relies solely upon the displacement of the core, so that information corresponding to the pen contact pressure can be obtained equally accurately over the entire area of the input region of the tablet. Furthermore, the input pen of the invention can be handled easily and in a good manner partly because the pen is composed of light parts such as the coil, capacitor, ferrite tip and so forth, and partly because the cable or the like means to be connected to the input pen can be eliminated.

A third object of the present invention is to provide an input pen for a coordinate input system which can provide accurate information concerning the pen contact pressure without requiring any cable to be connected thereto and which can provide a greater range of phase change.

To this end, according to still another aspect of the present invention, there is provided an input pen for a coordinate input system, comprising: a stem; a core received in said stem and slightly displaceable and resettable in the axial direction of said stem; a coil movably receiving said core; a capacitor connected to said coil; and ferrite tips provided on portions of said core corresponding to both ends of said coil.

In use, the user writes letters or other information on the tablet of a coordinate input system while pressing the input pen with varying pressure against the tablet. In consequence, the core is axially displaced in accordance with the pressure with the result that ferrite tips are displaced at both ends of the coil. In consequence, the magnetic permeability and, hence, the inductance of the coil are varied in accordance with the displacement of the core. As a result, the tuning frequency of the tuning circuit, composed of the coil and the capacitor, is slightly changed to cause a change in the phase and frequency of the voltage which is induced in response to the electric wave transmitted from the coordinate input system. The change in the phase and frequency of the induction voltage causes changes in the phase and frequency of the electric wave which is produced by the coil of the tuning circuit and such changes are received and processed on the coordinate input system whereby information concerning the displacement of the core, i.e., the pressure at which the input pen is pressed against the tablet, can be detected on the coordinate input system.

Since a couple of ferrite tips are provided on the respective portions of the core near corresponding ends of the coil, it is possible to obtain a greater amount of change in the information for a given displacement of the core, i.e., for a given amount of change in the contact pressure of the input pen, as compared with the second aspect of the invention.

These and other objects, features and advantages of the present invention will become clear from the following description of the preferred embodiments when the same is read in conjunction with the accompanying drawings.

BRIEF DESCRIPTION OF THE DRAWINGS

FIG. 7 is an illustration of voltage detected from each loop coil in a first cycle of coordinate detecting operation;

FIG. 8 is a timing chart illustrating the coordinate detecting operation and phase detecting operation in the second operation cycle onwards;

DESCRIPTION OF THE PREFERRED EMBODIMENTS

Figure 1:
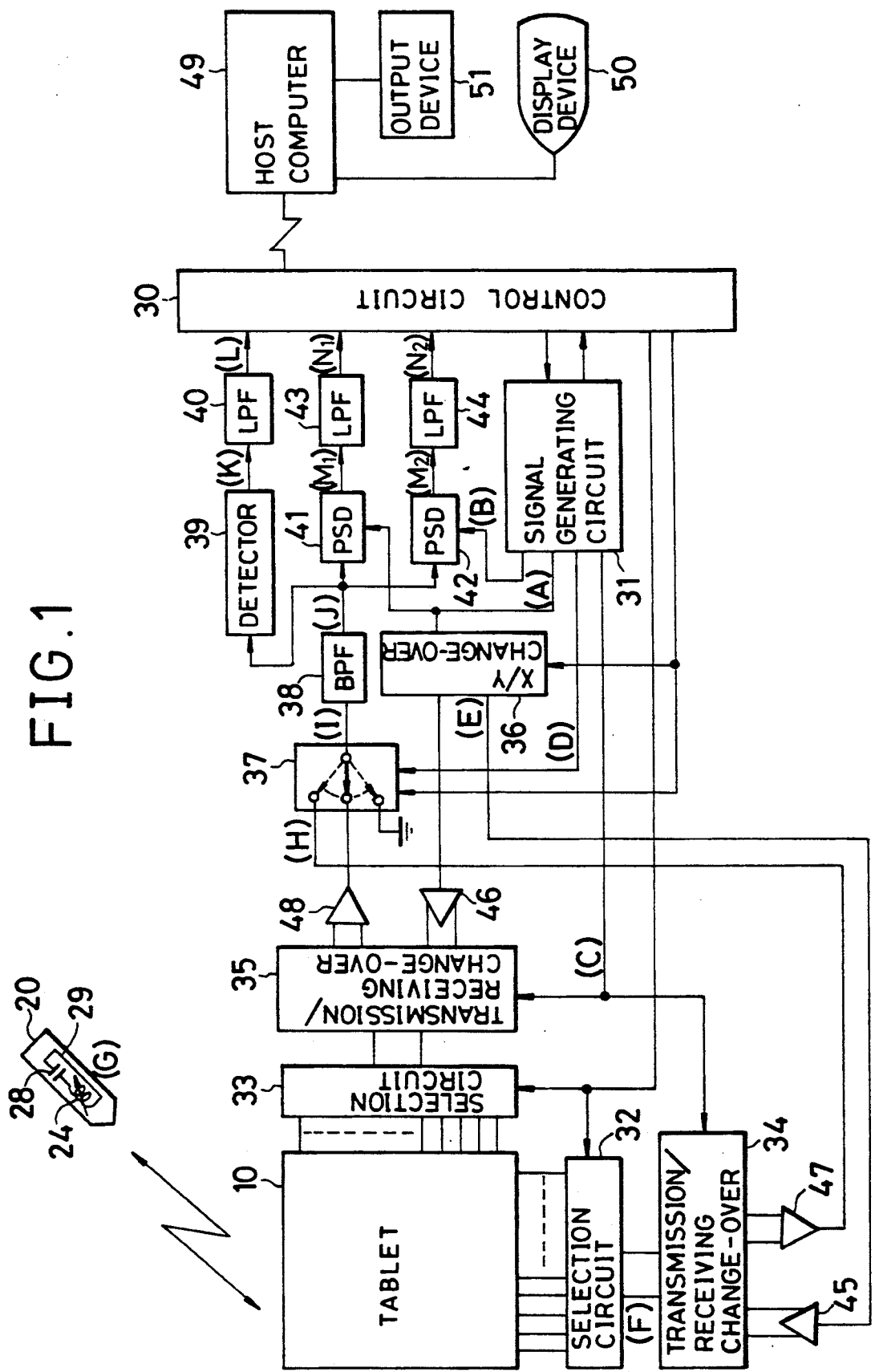
FIG. 1 is a schematic illustration of an embodiment of the coordinate input system in accordance with the present invention.

Referring to FIG. 1, a coordinate input system in accordance with the present invention has a tablet 10, an input pen 20, a control circuit 30, a signal generating circuit 31, X- and Y-direction selection circuits 32 and 33, transmission/receiving change-over circuits 34 and 35, an X-Y change-over circuit 36, and a receiving timing change-over circuit 37. The transmission/receiving change-over circuits 34, 35, X-Y change-over circuit 36 and the receiving timing change-over circuit 37 in cooperation provide a connection change-over means. The coordinate input system further has a band-pass filter (BPF) 38 which serves as a signal detection means. The coordinate input system further has a detector 39 and a low-pass filter (LPF) 40 which constitute, together with a control circuit 30 which will be mentioned later, a coordinate detection means. The coordinate input system also has phase detectors (PSD) 41 and 42 and low-pass filters (LPF) 43, 44 which cooperate with the later-mentioned control circuit 30 in providing a phase detection means. The coordinate input system further has various parts including driving circuits 45, 46, amplifiers 47, 48, a host computer 49 which includes a later-mentioned spread detection means, a display device 50 and an output device 51.

Figure 2:
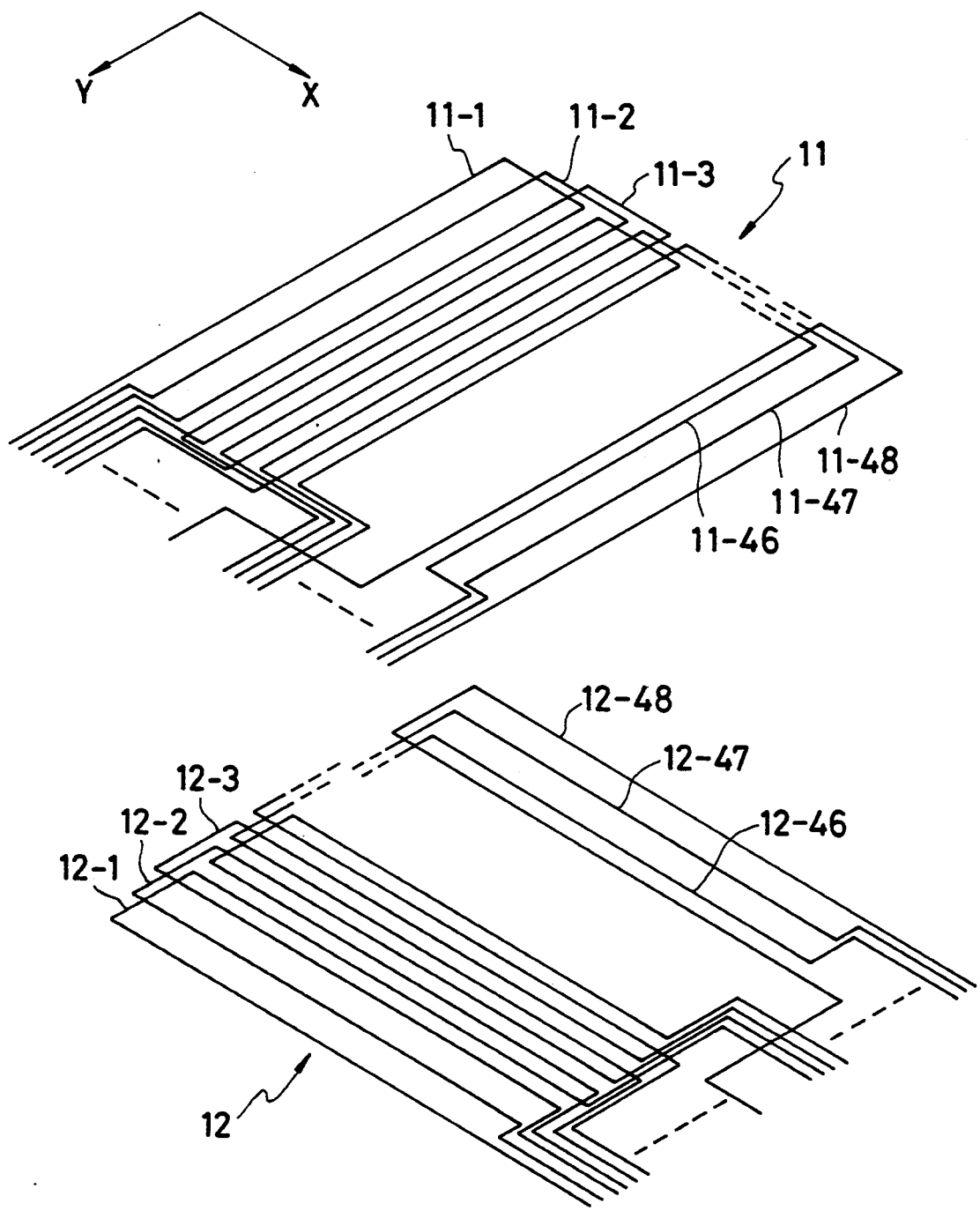
FIG. 2 is a detailed illustration of a tablet incorporated in the coordinate input system of FIG. 1, showing the detail of the X- and Y-direction loop coil assemblies.

FIG. 2 illustrates detail of the X-direction loop coil assembly 11 and the Y-direction loop coil assembly 12 which in cooperation provide the tablet 10. As will be seen from this Figure, the X-direction loop coil assembly 11 has a multiplicity of, e.g., 48, loop coils 11-1, 11-2, ..., 11-48 which are arranged in an overlapping manner in the X-direction in a side-by-side, i.e., juxtaposed or adjacent, fashion. Similarly, the Y-direction loop coil assembly 12 has a multiplicity of, e.g., 48, loop coils 12-1, 12-2, ..., 12-48 which are arranged in an overlapping manner in the Y-direction in a side-by-side, i.e. juxtaposed or adjacent fashion. The X-direction loop coil assembly 11 and the Y-direction loop coil assembly 12 superposed. closely one over the other (with no particular preference on which loop coil assembly is to be superposed on top), although they are separated in FIG. 2 for the purpose of clarification of the drawings. The X- and Y-direction loop coil assemblies 11 and 12 thus combined are encased in a casing (not shown) which is made of a non-metallic material. Although each loop coil has only one turn in the illustrated embodiment, this is only illustrative as each loop coil may necessarily have two or more, turns when required.

Figure 3:
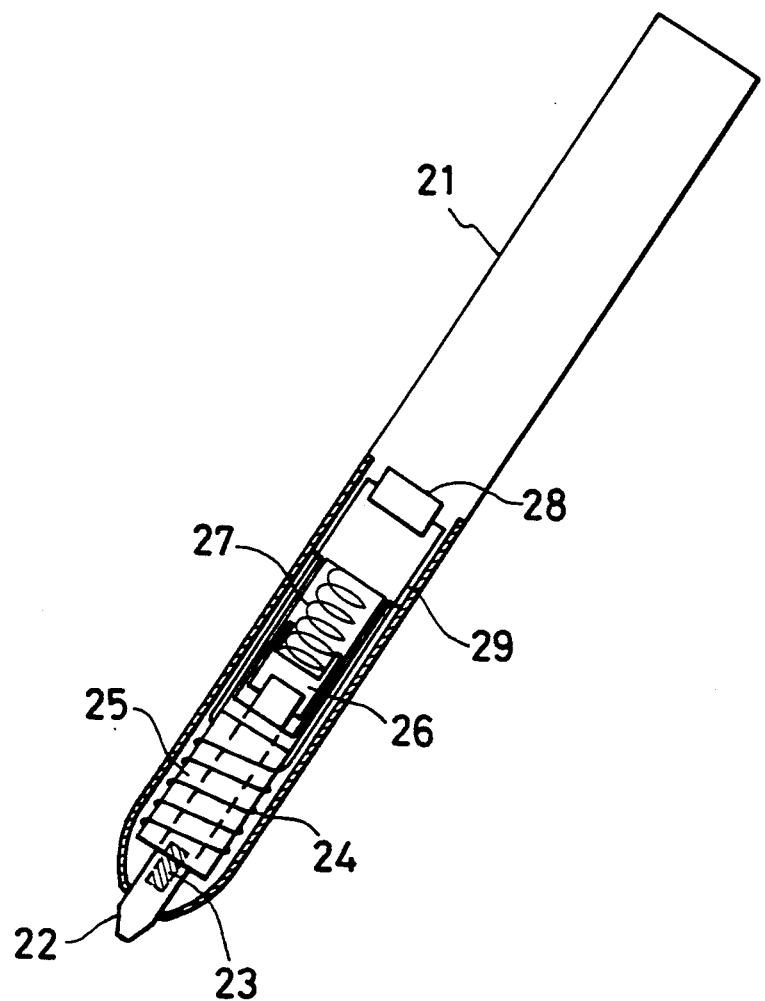
FIG. 3 is a sectional view of an input pen.

FIG. 3 shows the construction of an input pen 20. As will be seen from this Figure, the input pen 20 has a stem or a pen holder 21 made from a non-metallic material such as a synthetic resin, a core 22 provided with a relatively high magnetic permeable ferrite tip 23 thereon, a coil 24 wound on a ferrite core 25 having a through-hole slidably receiving the core 22, a core holder 26 holding the rear end of the core 22, a spring 27 which supports the core holder 26 in such a manner as to allow a slight displacement of the core holder 26 with respect to the pen holder 21, and a capacitor 28.

As shown in FIG. 1, the coil 24 and the capacitor 28 are connected in series to each other so as to form a tuning circuit 29 which is known per se. The inductance of the coil 24 and the capacitance of the capacitor 28 are so determined that the tuning circuit has a tuning or resonance frequency which is substantially equal to a predetermined frequency f0. The arrangement is such that, when the core 22 is held by the core holder 26, the ferrite tip 23 on the core is positioned so as to confront one end of the coil 24. In operation, the user scribes a letter or a drawing by sliding the input pen in contact with the tablet 10 while varying the contact pressure. During the writing, the core 22 and, hence, the ferrite tip 23 move with respect to the coil 24 so that the inductance of the coil 24 is changed with the result that the tuning frequency of the tuning circuit 29 is slightly changed.

The operation of this coordinate input system will be described with reference to the drawings. The description will be first made as to the manner in which the electric waves are exchanged between the tablet 10 and the pen 20, as well as the signals obtained during the exchange of the electric waves, with specific reference to FIG. 4.

Figure 5:
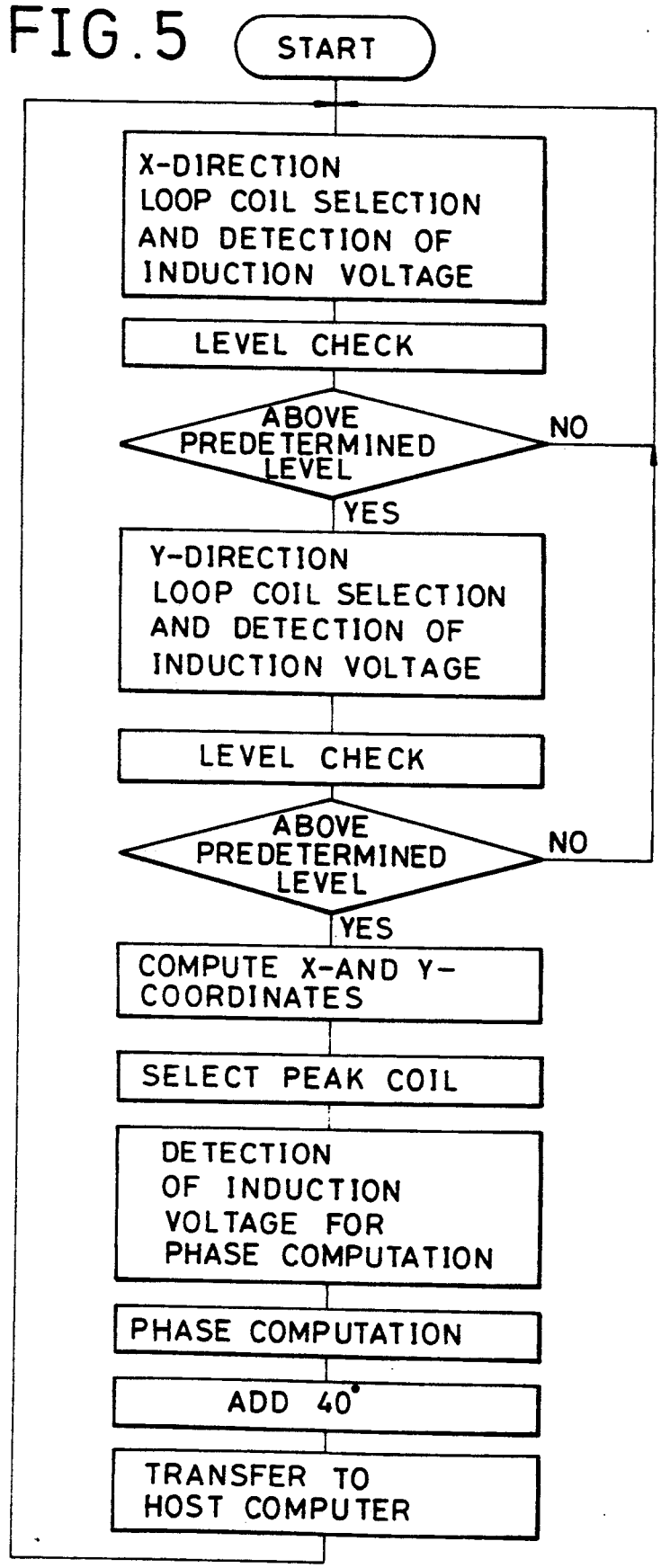
FIG. 5 is a flow chart showing flow of the process performed by the control circuit.
Figure 6:
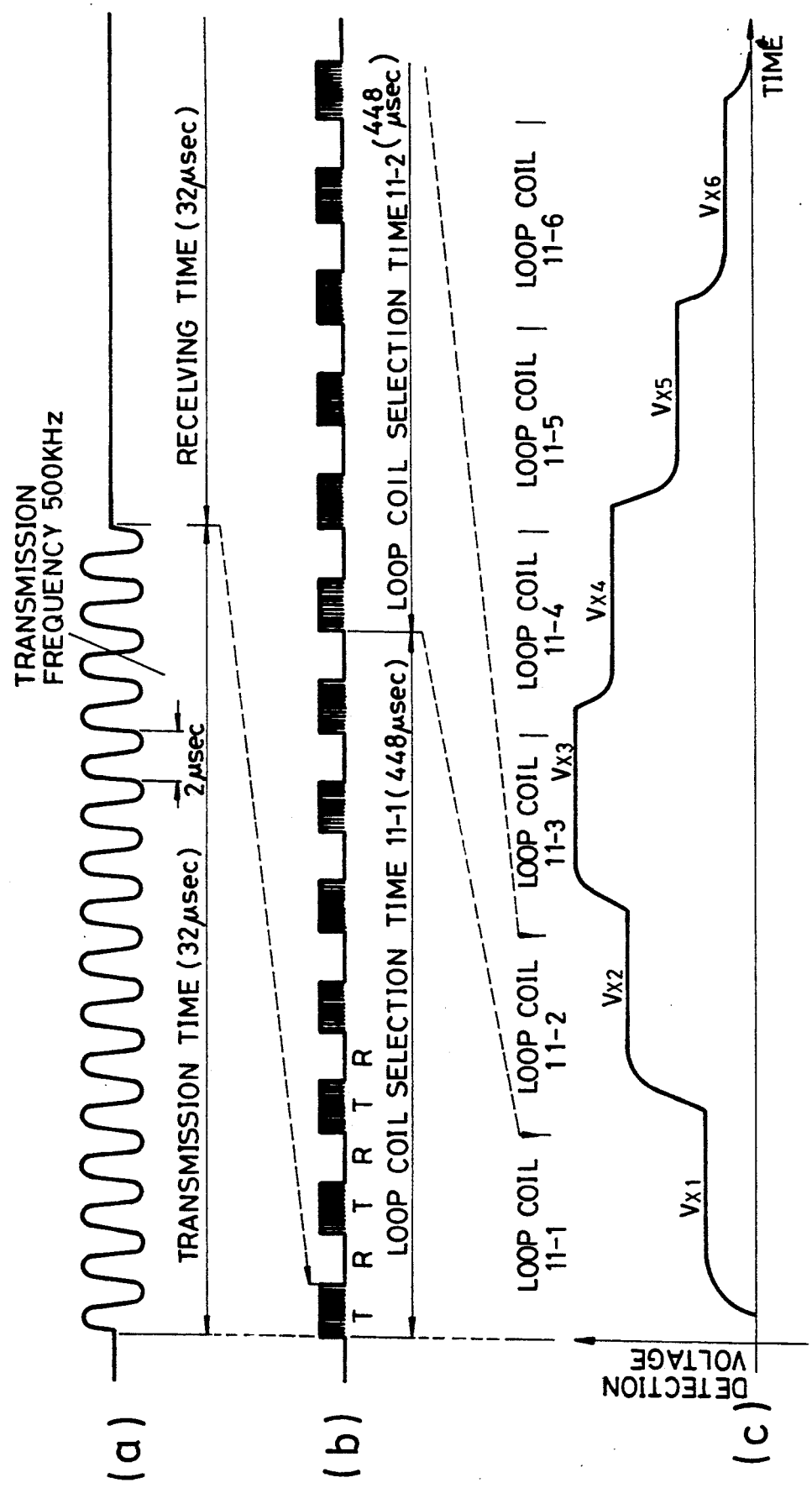
FIGS. 6(a), 6(b) and 6(c) are timing charts showing the basic coordinate detecting operation performed by the control circuit.

The control circuit 30 is constituted by, for example, a microprocessor which is known per se, and is designed to control a signal generating circuit 31. The control circuit 30 also controls the change-over between the loop coils of the tablet 10 through controlling the selection circuits 32 and 33 in accordance with the flow which is shown by the flow chart of FIG. 5. The control circuit 30 also controls the X-Y change-over circuit 36 and the receiving timing change-over circuit 37 so as to change-over the direction of detection of coordinate position. The control circuit 30 also is capable of conducting analog-to-digital conversion (A/D) of the outputs from the low-pass filters 40, 43 and 44, and executing an arithmetic operation which will be explained later, thereby determining the coordinates of the point input by the input pen 20. The control circuit 30 also detects the phase of the received signal and delivers the detected phase to the host computer 49.

The selection circuit 32 is designed to successively select one of the loop coils of the X-direction loop coil assembly 11. Similarly, the selection circuit 33 is capable of successively selecting one of the loop coils of the Y-direction loop coil assembly 12. These selection circuits 32 and 33 operate in accordance with the information given by the control circuit 30.

The transmission/receiving change-over circuit 34 is designed to connect the X-direction loop coil selected by the selection circuit 32 alternately to the driving circuit 45 and the amplifier circuit 47. Similarly, the transmission/receiving change-over circuit 35 is designed to connect the X-direction loop coil selected by the selection circuit 33 alternately to the driving circuit 46 and the amplifier circuit 48. These circuits 34 and 35 operate in accordance with a later-mentioned transmission/receiving change-over signal.

The signal generating circuit 31 is adapted for generating a rectangular wave signal A of a predetermined frequency f0, e.g., 500 kHz, a signal B which is obtained by delaying the rectangular wave signal A by 90°, a transmission/receiving change-over signal C of a predetermined frequency, e.g., 15.625 kHz, and a receiving timing signal D. The rectangular wave signal A is directly delivered to the phase detector 41 and is converted to a sine-wave signal E by a low-pass filter which is not shown. The sine-wave signal E is delivered to either one of the driving circuits 45 and 46 through the X-Y change-over circuit 36. The rectangular wave signal B is delivered to the phase detector 42, while the transmission/receiving change-over signal C is delivered to the transmission/receiving change-over circuits 34, 35. The receiving timing signal D is supplied to the receiving timing change-over circuit 37.

Assume here that information for selecting the X-direction is being input from the control circuit 30 to the X-Y change-over circuit 36 and the receiving timing change-over circuit 37. In such a case, the sine wave signal E is delivered to the driving circuit 45 so as to be converted into an equilibrium signal which is then delivered to the transmission/receiving change-over circuit 34. The transmission/receiving change-over circuit 34 is connected to either one of the driving circuit 45 and the amplifier 47 in accordance with the transmission/receiving change-over signal C. Therefore, the transmission/receiving change-over circuit 34 delivers to the selection circuit 32 a signal F which contains signals of 500 kHz issued at every predetermined time T (=½fk) which is in this case 32 μsec.

The signal F is delivered, through the selection circuit 32, to one of the X-direction loop coils 11-i (i=1, 2, ..., 48) of the tablet so that the loop coil 11-i produces an electric wave corresponding to the signal F.

If the input pen 20 is held substantially upright on the tablet 10, i.e., in a state ready for use, the electric wave excites the coil 24 of the input pen 20 so that a voltage G synchronous with the signal F is generated in the tuning circuit 29.

The subsequent period in which the 500 kHz signal of the signal F is absent is the receiving period. In this period, the loop coil 11-i is connected to the amplifier 47 so that the electric wave from the loop coil 11-i is extinguished without delay but the induction voltage G gradually attenuates in accordance with the loss in the tuning circuit 29.

The induction voltage G produces an electric current which flows through the tuning circuit 29. The electric current thus flowing through the coil 24 generates an electric wave which acts to excite the loop coil 11-i connected to the amplifier 47. In consequence, a voltage is induced in the loop coil 11-i by the electric wave issued from the coil 24. The induction voltage is delivered by the transmission/receiving change-over circuit 34 to the amplifier 47 only in the receiving period and is amplified by the amplifier 47 so as to become a received signal H which is delivered to the receiving timing change-over circuit 37.

The receiving timing change-over circuit 37 receives either one of the X- or Y-direction selection information (X-direction selection information in the illustrated case), as well as the receiving timing signal D which is materially a signal obtained by inverting the transmission/receiving change-over signal C. The receiving timing change-over circuit 37 delivers the received signal H when the signal D is of "High" (H) level, whereas, when the receiving timing signal D is of "Low" (L) level, the receiving timing change-over circuit 37 does not deliver any signal. In consequence, a signal I, which is materially the same as the received signal H, is obtained at the output of the received timing change-over circuit 37.

The signal I is delivered to the band-pass filter 38 which is a ceramic filter having a resonance frequency f0. The band-pass filter 38 delivers to the detector 39 and also to the phase detectors 41, 42 a signal J having an amplitude corresponding to the energy of the component of the signal I having the frequency f0. Strictly speaking, several pieces of signals I are input to the band-pass filter 38 and converged.

The signal J input to the detector 39 is detected and rectified so as to become a signal K and is converted by the low-pass filter 40 having a sufficiently low cut-off frequency to a D.C. signal L having a voltage value which is about half the amplitude, e.g., Vx, and the thus obtained D.C. signal is delivered to the control circuit 30.

The voltage value Vx of the signal L has a dependency on the distance between the input pen 20 and the loop coil 11-i. More specifically, in the illustrated embodiment, the voltage value Vx is substantially in inverse proportion to the biquadrate of the above-mentioned distance. Thus, the voltage value Vx changes each time a new loop coil 11-i is selected. The control circuit 30 operates to convert the voltage value Vx obtained for each loop coil into a digital value and conducts a later-mentioned arithmetic operation on the voltage values Vx obtained for the respective loop coils, whereby the X-direction coordinate input by the input pen 20 is determined. The Y-coordinate value input by the input pen 20 also is determined in the same manner.

The phase detectors 41 and 42 are in receipt of rectangular wave signals A and B as detection signals. If the phase of the signal J is substantially equal to the phase of the rectangular wave signal A, the phase detector 41 delivers a signal M1 which is obtained by inverting the signal J to the positive side, i.e., a signal materially the same as the signal K, while the phase detector 42 delivers a signal M2 having symmetrical positive and negative portions.

The signal M1 mentioned before is converted by a low-pass filter 43 to a D.C. current N1 (substantially the same as the signal L) having a voltage value corresponding substantially to ½ the amplitude of the signal J, i.e., the voltage Vx. The D.C. signal N1 is delivered to the control circuit 30. On the other hand, the signal M2 is converted by a similar low-pass filter 44 into a D.C. signal N2 and thus delivered to the control circuit 30. Since the positive and negative components of the signal M2 from the phase detector 42 are the same, the low-pass filter 44 delivers an output of 0 [V].

The outputs from the low-pass filters 43 and 44, i.e., the signals N1 and N2, are converted into digital signals by the control circuit 30. An arithmetic operation is executed on these digital values in accordance with the following formula (1), thereby determining the phase difference $\theta$ between the signals delivered to the phase detectors 41 and 42, i.e., the difference of the phase between the signal J and the rectangular wave signal A in the described embodiment.

$$\theta = -\tan^{-1}(VQ/VP) \qquad (1)$$

where, VP represents the digital value corresponding to the output from the low-pass filter 43, while VQ represents a digital value corresponding to the output of the low-pass filter 44. For instance, in the case of the signal J mentioned before, the voltage values of the signals N1 and N2 are Vx and 0[V], respectively, i.e., the condition of VQ=0 is met, so that the phase difference $\theta$ is determined to be $\theta = 0°$.

The phase of the signal J varies in response to the tuning frequency of the tuning circuit 29 of the input pen 20. Namely, when the tuning frequency of the tuning circuit 29 coincides with the predetermined frequency f0, the induction voltage of the frequency f0 is generated in the tuning circuit both in the transmission period and in the receiving period. In consequence, an induction current synchronous with the induction voltage is generated and made to flow through the tuning circuit. Therefore, the frequency and the phase of the received signal H (or I) coincide with those of the rectangular wave signal A and, in consequence, the phase of the signal J coincides with that of the rectangular wave signal A.

When the tuning frequency of the tuning circuit 29 does not coincide with a predetermined frequency f0, e.g., if the frequency is f1 which is slightly below the frequency f0, induction voltage of the frequency f0 is generated in the tuning circuit 29 in the signal transmission period. In this period, however, the induction current flowing through the tuning circuit 29 has a certain phase delay. In the signal receiving period, an induction voltage of a frequency substantially equal to the frequency f1 and an induction current substantially synchronous with the induction voltage are generated in the tuning circuit. In consequence, the frequency of the received signal H (or I) is slightly lower than the frequency of the rectangular wave signal A and the phase of the received signal H (or I) is slightly delayed from the phase of the rectangular wave signal A. As explained before, the band-pass filter 38 passes only the frequency f0. Any input signal of a frequency lower than f0, therefore, is output from this band-pass filter 38 with a phase delay. Thus, the phase of the signal J is further delayed from the received signal H (or I).

When the tuning frequency of the tuning circuit 29 is slightly higher than the predetermined frequency f0, e.g., f2, an induction voltage of a frequency f0 is generated in the tuning circuit 29 in the signal transmission period but the induction current generated by this induction voltage has a phase advance with respect to the phase of the voltage. In the signal receiving period, an induction voltage of a frequency substantially equal to the frequency f2 and a current synchronous with this voltage are generated in the tuning circuit. In consequence, the received signal H (or I) has a frequency which is slightly higher than that of the rectangular wave signal A and a phase which is slightly advanced from the phase of the rectangular wave signal A. The frequency offset of the input of the band-pass filter 38 to higher-frequency side appears as a phase advance of the output from this band-pass filter, on the contrary to the case of the frequency offset to the lower-frequency side. In consequence, the phase of the signal J is further advanced from the received signal H (or I).

As explained before, the tuning frequency of the tuning circuit 29 varies according to the pressure with which the input pen 20 is pressed against the tablet. Therefore, the value $\theta$ of the phase difference determined by the formula (1) also varies depending on the pen pressure. The described embodiment is set such that the phase difference $\theta$ is about $-60°$ when no pressure is exerted on the input pen 20, whereas, when the pen is loaded with the maximum pressure, the phase difference $\theta$ is about 60°.

A value of 40° is added to the phase difference $\theta$ as determined by the formula (1) so as to be changed into phase information, i.e., phase difference value, which generally ranges between $-20°$ and 100°. The thus obtained phase information is delivered to a host computer 49 together with the X- and Y-coordinate values. The addition of the angular value 40° to the phase difference may be done by the host computer 49.

A detailed description will be given hereafter of the operations for detecting the coordinate values and for detecting the phase information, as well as the operation for converting the phase information into the spread of the coordinate point, with specific reference to FIGS. 5 to 9.

The system becomes ready to operate as the power of the whole system is turned on. Namely, as the power is turned on, the control circuit 30 delivers information for selecting the X-direction to the X-Y change-over circuit 36 and to the timing change-over circuit 37. At the same time, the control circuit 30 delivers to the selection circuit 32 information for selecting the first loop coil 11-1 of the X-direction loop coil assembly 11 of the tablet 10, so that the first loop coil 11-1 is selected from among the plurality of loop coils 11-1 to 11-48 and is connected to the transmission/receiving change-over circuit 34.

Figure 4:
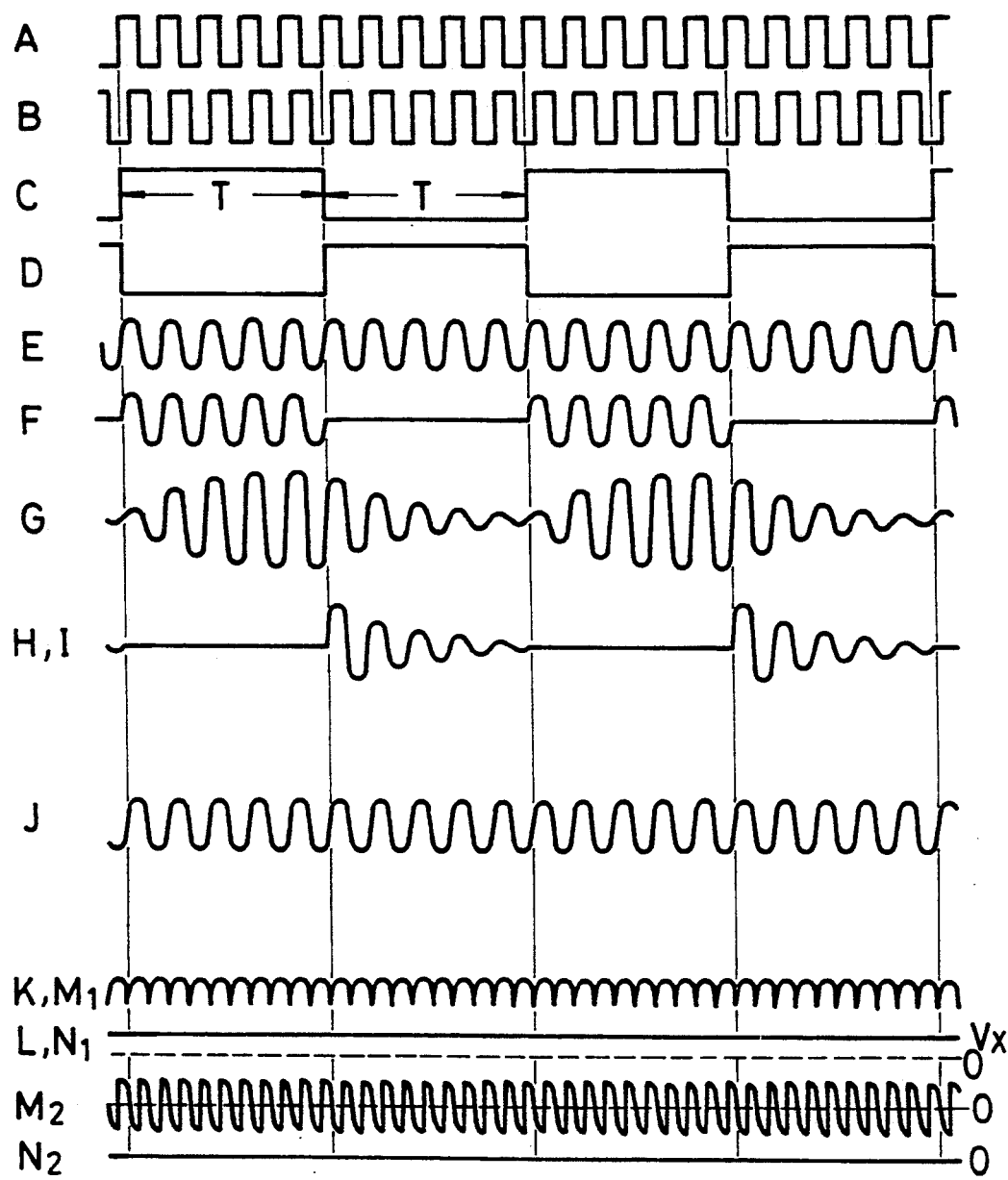
FIG. 4 is a signal waveform chart showing waveforms of various signals obtained at various portions of the embodiment shown in FIG. 1.

The transmission/receiving change-over circuit 34 operates such as to connect the loop coil 11-1 alternately to the driving circuit 45 and the amplifier 47, in accordance with the transmission/receiving change-over signal C. Meanwhile, the driving circuit 45 delivers to the loop coil 11-1 16 pieces of sine waves of signal of 500 kHz (see FIG. 6(a)) in the transmission period of 32 $\mu$sec. In FIG. 4, only five out of 16 waves are shown for the purpose of clarification of the drawings.

The change-over between the transmission and receiving is conducted seven times for each loop coil, i.e., for the loop coil 11-1, as will be seen from FIG. 6(b). The time length corresponding to seven cycles of change-over between the transmission and receiving corresponds to the period (448 $\mu$sec) of selection of one loop coil.

In consequence, the amplifier 47 outputs an induction voltage in each of seven receiving periods. As explained before, the induction voltages are delivered through the receiving timing change-over circuit 37 to the band-pass filter 38 so as to be averaged. The averaged output from the band-pass filter 38 is delivered to the control circuit 30 via the detector 39, phase detectors 41, 42 and low-pass filters 40, 43 and 44.

The control circuit 30 receives the output of the low-pass filter 40 after an A/D conversion and temporarily stores this input as a detection voltage, e.g., V×1, which has a dependency on the distance between the input pen 20 and the loop coil 11-1.

Subsequently, the control circuit 30 delivers information for selecting the loop coil 11-2 to the selection circuit 32 so that the second loop coil 11-2 is selected and connected to the transmission/receiving change-over circuit 34. Then, through the same process as that explained in connection with the first coil 11-2, a detection voltage $V \times 2$ having a dependency on the distance between the input pen 20 and the loop coil 11-2 is determined and stored. The described operation is conducted repeatedly to connect successive loop coils 11-3 to 11-48 to the transmission/receiving change-over circuit 34, whereby detection voltages $V \times 1$ to $V \times 48$ corresponding to the X-direction distances between the input pen 20 and the respective loop coils are determined and stored as shown in FIG. 6(c).

Actually, however, the detection voltages appear only in several loop coils on each side of the position xp of the pen 20, as will be seen from FIG. 7.

The control circuit 30 conducts a check as to whether the values of the detection voltages stored as described above exceed a predetermined detection threshold level or not. If the predetermined detection threshold level is not reached, the control circuit 30 operates so as to repeat the selection of the X-direction loop coils and detection of voltages. If the threshold level is reached, however, the process proceeds to a next step.

Namely, the control circuit 30 operates to deliver information for selecting the Y-direction to the X-Y change-over circuit 36 and the receiving timing change-over circuit 37 so that the selection circuit and the transmission/receiving change-over circuit are switched in the same manner as that described in connection with the operation in the X-direction position detection. Thus, the control circuit 30 temporarily stores the detection voltages corresponding to the distances between the respective Y-direction loop coils 12-1 to 12-48 and the input pen 20 as obtained through A/D conversion of the output from the low-pass filter 40 produced through the exchange of electric waves. Subsequently, a level check is executed to determine whether a predetermined detection threshold level is reached. When the detection threshold level is not reached, the operation is repeated to select successive Y-direction loop coils and to detect the voltages. If the predetermined detection threshold level is reached, however, the process proceeds to a next step to compute the X- and Y-coordinate values of the position of the input pen 20.

Subsequently, the control circuit 30 delivers to the selection circuit 32 (or selection circuit 33) to enable the selection of the X-direction loop coil (or Y-direction loop coil) which has exhibited the highest detection voltage from among the plurality of X-direction coils 11-1 to 11-48 (or Y-direction loop coils 12-1 to 12-48). Such loop coil which has exhibited the highest detection voltage will be referred to as a "peak coil", so as to conduct the transmission and receiving of the electric waves with this peak coil seven times as explained before and executes A/D conversion of the outputs derived from the low-pass filters 43 and 44, thereby to compute the phase difference $\theta$ in the manner explained before.

Then, the aforementioned angular value of 40° is added to the phase difference $\theta$ so that phase information is formed which is transmitted to the host computer 49 together with the X- and Y-direction coordinate values of the position of the input pen 20 which have been determined as described before.

The first cycle of operation for detecting the coordinate values of the pen position and for detecting the phase difference is thus completed. Then, the control circuit 30 conducts second and subsequent operation cycles, as will be explained hereafter with reference to FIG. 8. Namely, the control circuit 30 delivers to the selection circuit 32 information for selecting a predetermined number of X-direction loop coils, e.g., 10 coils, centered at the peak loop coil mentioned before, from among the X-direction loop coils 11-1 to 11-48. Similarly, the control circuit 30 delivers to the selection circuit 33 information for selecting a predetermined number of Y-direction loop coils, e.g., 10 coils, centered at the peak loop coil mentioned before, from among the Y-direction loop coils 12-1 to 12-48. In consequence, the detection of the X- and Y-direction coordinate values of the input pen 20, as well as the detection of the phase difference, is conducted for these 10 loop coils in the same manner as that described before, so that coordinate value and the phase information are obtained and transmitted to the host computer 49. The control circuit 30 then repeats the described operation.

The level checking operation explained before includes an operation for checking whether the maximum value of the detection voltages has reached the predetermined detection threshold level and an operation for detecting the peak loop coil which has exhibited the highest detection voltage. If the detection threshold level is not reached, the subsequent operation such as the computation of the coordinate values is inhibited. The level checking operation also includes an operation for setting the center of the group of the loop coils which are to be selected in the next cycle of coordinate-position and phase detecting operation.

The detection of the X- and Y-direction coordinate values of a point, e.g., coordinate values xp, can be conducted by various methods. For instance, it is possible to determine the coordinate values drawing a curve by plotting the detection voltages exhibited by the successive loop coils, approximating the portion of the curve near the peak by a suitable function, and arithmetically determining the coordinate of the maximum value of the function.

For instance, referring to FIG. 6(c), the maximum value $V \times 3$ of the detection voltage and the voltages $V \times 2$ and $V \times 4$ on both sides of the maximum voltage $V \times 3$ are approximated by a quadratic function. In such a case, the coordinate value xp of the input pen 20 can be determined as follows.

The following formulae are derived from the relationships between the voltages and the coordinate values.

$$V \times 2 = a(x2 - xp)^2 + b \tag{2}$$

$$V \times 3 = a(x3 - xp)^2 + b \tag{3}$$

$$V \times 4 = a(x4 - xp)^2 + b \tag{4}$$

where, x1 to x48 represent the coordinate values of the centers of the loop coils 11-1 to 11-48, while $\Delta x$ represents the pitch of these centers. Symbols a and b represent constants where a meets the condition of $(a < 0)$.

The following conditions also are established.

$$x3 - x2 = \Delta x \tag{5}$$

$$x4 - x2 = 2\Delta x \tag{6}$$

The formulae (5) and (6) are substituted in formulae (3) and (4) so that the following condition is derived.

$$xp = x2 + \Delta x/2\{3V\times2 - 4V\times3 + V\times4)/(V\times2 - 2V\times3 + V\times4)\} \quad (7)$$

It is therefore possible to determine the coordinate value xp of the position of the input pen 20, by extracting, from the group of detection voltages V×1 to V×48, the maximum detection voltage and the voltages detected from the loop coils on both sides of the coil from which the maximum voltage has been detected, and executing the computation of the formula (7) by using these voltage values and the coordinate value (known) of the loop coil which is immediately before the coil from which the maximum voltage has been detected.

Figure 9:
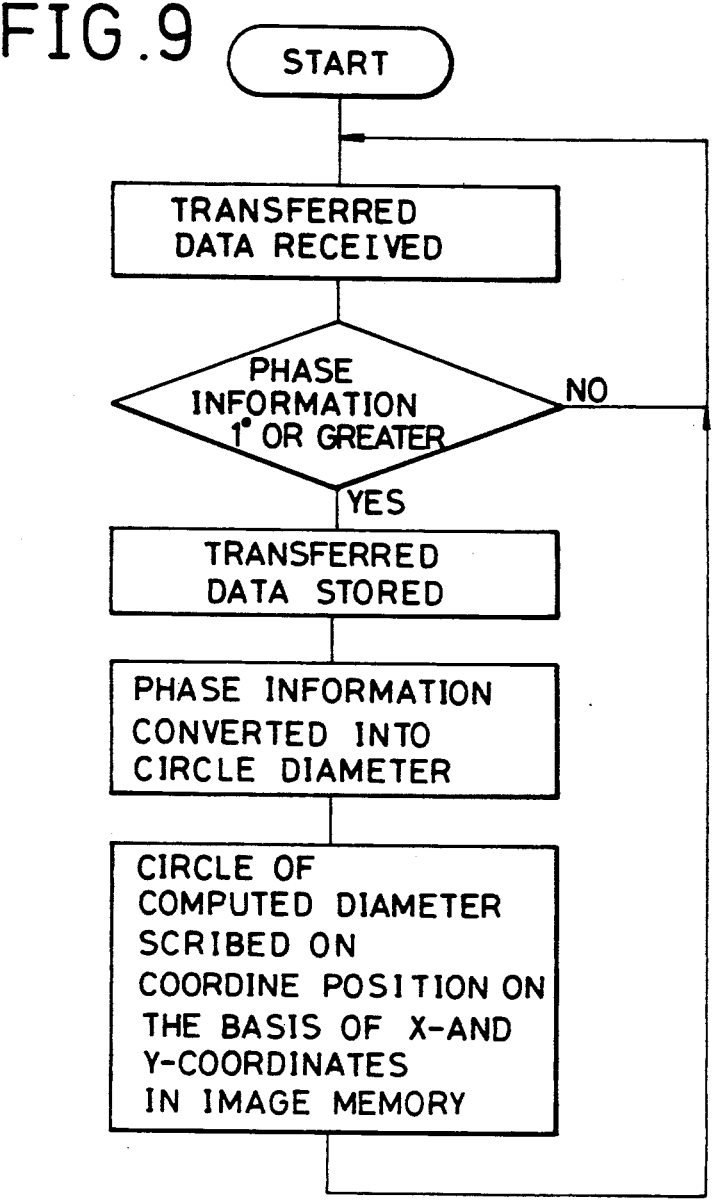
FIG. 9 is a flow chart showing the process of operation performed by a host computer.

The host computer 49 operates in accordance with the flow chart shown in FIG. 9 and stores, as effective data, only the data which contain the phase information of not smaller than 1°. The host computer 49 then converts the phase information into information concerning the spread of the coordinate point, e.g., into a circle of a diameter proportional to the coordinate information. The host computer 49 then scribes an image of the circle having the above-mentioned diameter in the coordinate position of the X- and Y-coordinate values on an image memory which is not shown, and displays the image of the circle on the display device 50.

Figure 10:
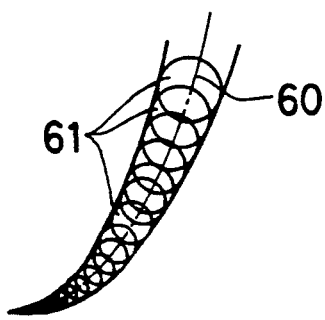
FIG. 10 is an illustration of an image which is formed when the input pen is moved while varying the contact pressure.
Figure 11A:
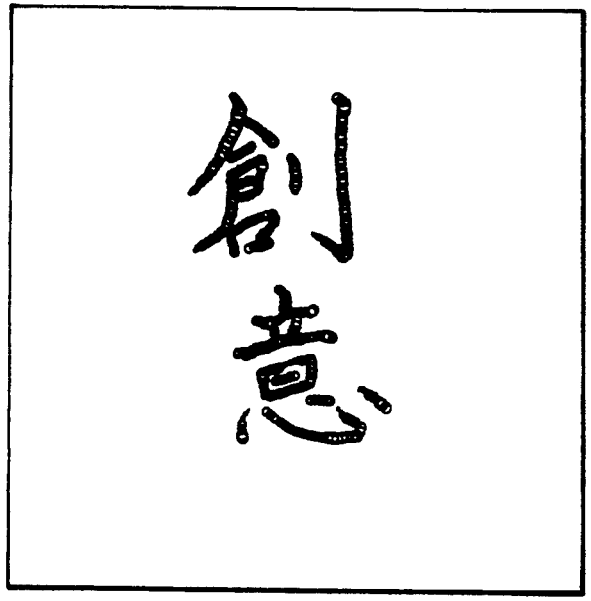
FIGS. 11(a) and 11(b) are illustrations of examples of output results.
Figure 11B:
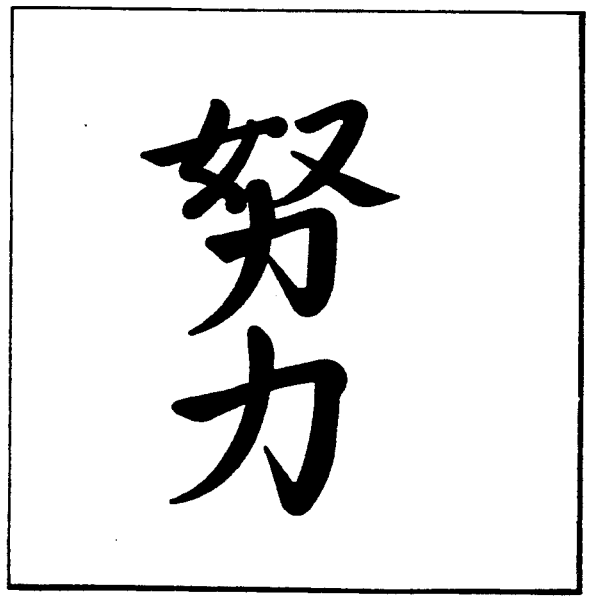

The above-described operation is repeated as long as the data transfer from the control circuit is continued. Therefore, as the user moves the input pen 20 while varying the contact pressure, images of circles having various diameters are arrayed along the locus 60 of the coordinate point as shown in FIG. 10, whereby an image similar to that drawn by a Japanese pen can be obtained. It is possible to produce a hard copy of the thus obtained image by means of an output device 51. An example of the output from the output device 51 is shown in FIG. 11(a). By executing a process for blackening or inking the circles, it is possible to obtain an output which more closely simulates the touch of a Japanese pen.

Another embodiment of the input pen 20 in accordance with the present invention will be described with reference to FIGS. 12 and 13 in which the same reference numerals are used to denote the same parts or members as those in the preceding embodiment.

Figures 12, 13A, 13B:
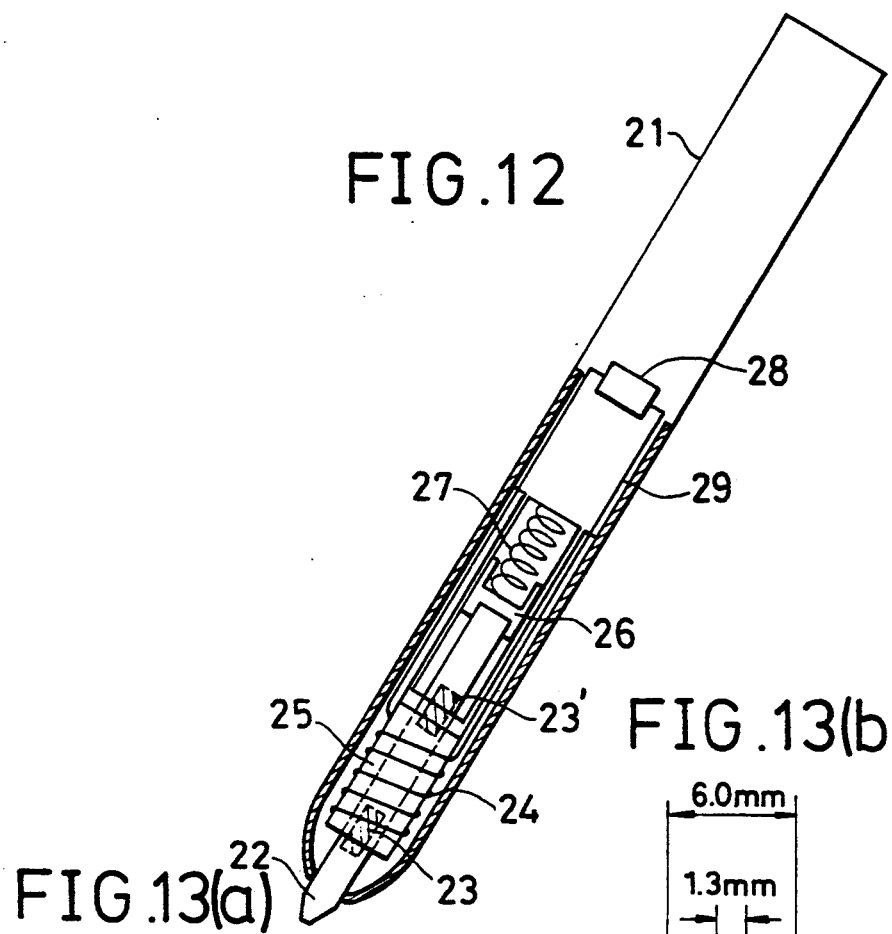
FIG. 12 is a sectional view of another embodiment of an input pen in accordance with the present invention.
FIGS. 13(a) and 13(b) are illustrations of positional relationship between the ferrite chip and coil.

Referring to FIG. 12, an input pen 20 has a pen holder or a shaft 21 made from a non-metallic material such as a synthetic resin, a core 22 having relatively high magnetic permeable ferrite tips 23 and 23', a coil 24 wound on a ferrite core 25 having a central aperture which slidably receives the core 22, a core holder 26 which holds the rear end of the core 22, a spring 27 which supports the core 22 in such a manner as to allow a slight displacement of the core holder 26 with respect to the shaft 21, and a coil 24 and a capacitor 28.

The coil 24 and the capacitor 28 are connected in series to each other so as to form a tuning circuit 29 known per se. The inductance of the coil 24 and the capacitance of the capacitor 28 are so determined that the tuning frequency (resonance frequency) of the tuning circuit is substantially equal to a predetermined frequency f0. The arrangement is such that the ferrite tips 23 and 23' on the core 22 held by the core holder 26 are located at positions confronting both ends of the coil 24. When the user manipulates the input pen 20 on the tablet 10 while varying the pen contact pressure, the ferrite tips 23 and 23' are displaced in accordance with the change in the pen pressure so that the inductance of the coil 24 is changed with the result that the tuning frequency of the tuning circuit 29 is slightly changed.

FIG. 13 illustrates in detail the positional relationship between the ferrite tips 23, 23' and the coil 24. More specifically, FIG. 13(a) illustrates the state in which no pressure is applied to the core 22 of the input pen 20. In this state, about ⅔ of the whole length of the ferrite tip 23 is received in the coil 24, i.e., in the aperture of the core 25, with the remaining ⅓ exposed outside the coil 24. Meanwhile, the ferrite tip 23' is wholly exposed outside the coil 24 with its one end placed in contact with the adjacent end of the coil 24. FIG. 13(b) illustrates the state in which the core 22 has been fully displaced by the pressure applied to the pen. In this state, the ferrite tip 23 is wholly received in the coil 24, while the ferrite tip 23' is positioned such that its end is spaced apart from the end of the coil 24 by the amount corresponding to the amount of displacement. Needless to say, the numerical values or dimensions shown in the drawings are only illustrative and may be varied as desired.

In this embodiment, a greater amount of change in the coil inductance can be obtained as compared with the input pen of the preceding embodiment, by virtue of the provision of more than one ferrite tips. More specifically, this embodiment of the input pen can provide a dynamic range of the phase which is about 1.5 to 2 times as large as that obtained with the input pen of the preceding embodiment which has only one ferrite tip 23.

Although the invention has been described through specific terms, it is to be understood that the described embodiments are only illustrative and various changes and modifications may be imparted thereto.

For instance, the numbers and the arrangements of the loop coils in the described embodiments are not exclusive and may be varied. It is also possible to design, by adopting a suitable program in the host computer the coordinate input system of the present invention such that the host computer converts the information concerning the change in the pen contact pressure into any desired kind of information, although the described embodiment is designed to convert the pressure information into size of the coordinate point. For instance, it is possible to design the coordinate input system of the present invention such that a change is caused in the hue or brightness at an appointed coordinate point or area in accordance with the pressure at which the input pen is pressed against the tablet. Thus, the present invention finds spreading use in the fields of computer-aided graphical and other designs.

What is claimed is:

1. A method of determining the position of an implement on a tablet and the pressure of the implement on a surface of the tablet, the implement including a tuned circuit with a predetermined resonant frequency and a pressure responsive reactance connected in circuit with the tuned circuit, the pressure responsive reactance having a value that changes as a function of the pressure of the implement on the surface of the tablet, the tablet including coils arranged in two coordinate directions, comprising the steps of:

sequentially exciting at least some of the coils with AC energy having approximately the same frequency as the resonant frequency, the tuned circuit interacting with the AC energy to change the AC current flowing in at least some of the coils so the AC current change at the resonant frequency in at least some of the coils arranged in the two coordinate directions designates the implement position on the tablet and the pressure of the implement on the surface, the AC current change designating the implement on the surface being derived from the same coils of the tablet; and responding to the changes in the AC current flowing in said same coils that designate the implement position on the tablet and the pressure of the implement on the surface to indicate the implement position and the pressure of the implement on the surface at positions indicated by the implement on the surface.

2. The method of claim 1 wherein the responding step further comprises the step of detecting the amplitude of the current flowing in at least some of the coils to indicate the implement position.

3. The method of claim 2 wherein the responding step further comprises the step of detecting the phase of the current flowing in said same coils to indicate the pressure of the implement on the surface.

4. The method of claim 1 wherein the responding step further comprises the step of detecting the phase of the current flowing in said same coils to indicate the pressure of the implement on the surface.

5. The method of claim 4 wherein the pressure of the implement on the surface for a particular indicated position is indicated by detecting the same coil having the greatest change in AC current flowing therein in response to the tuned circuit interacting with the AC energy, and detecting the phase of the current flowing only in the detected coil.

6. The method of claim 1 wherein at least some of the coils are excited during a first interval with the AC energy at the predetermined frequency, and the indication of the implement position is derived by responding to energy coupled back to at least some of the same coils from the tuned circuit during a second interval while none of the coils are excited by the AC energy at the predetermined frequency.

7. The method of claim 1 wherein the tuned circuit interacts with the AC energy to cause the changes in the AC current to be greatest in same coils closest to the implement; further comprising the steps of:
thereafter sequentially exciting only the same coils having the greatest changes in AC current; and
responding to the AC current flowing in at least some of the same coils to indicate the position of the implement.

8. The method further comprising the steps of detecting the amplitude of the current flowing in at least some of the coils to indicate the position of the implement.

9. The method of claim 8 wherein the pressure of the implement on the surface is indicated by detecting the phase of the current flowing in said same coils.

10. The method of claim 7 wherein the pressure of the implement on the surface is indicated by detecting the phase of the current flowing in said same coils.

11. The method of claim 7 wherein the position of the implement is indicated by detecting the amplitude of the current change in the same coil having the greatest change and the amplitudes of the current change in the same coils adjacent the coil having the greatest change, and interpolating the values of the amplitudes of the current change between the same coil having the greatest change and the same coils adjacent thereto.

12. Apparatus for determining the position of an implement on a surface, the implement including a tuned circuit with a predetermined resonant frequency and a pressure responsive reactance connected in circuit with the tuned circuit, the pressure responsive reactance having a value that changes as a function of the pressure of the implement on the surface, the apparatus comprising
a tablet carrying the surface and including the coils arranged in two coordinate directions,
means for sequentially exciting at least some of the coils with AC energy having approximately the same frequency as the resonant frequency, the tuned circuit interacting with the AC energy to change the AC current flowing in at least some of the coils so the AC current change at the resonant frequency in at least some of the coils arranged in the two coordinate directions designates the implement position on the tablet and the pressure of the implement on the surface, the AC current change designating the implement position on the tablet and the pressure of the implement on the surface being derived from the same coils of the tablet;
means responsive to the AC current changes flowing in said same coils that designate the implement position on the tablet and the pressure of the implement on the surface for indicating the implement position and the pressure of the implement on the surface at the indicated implement positions on the surface.

13. The apparatus of claims 12 wherein the means for indicating the implement position comprises means for detecting the amplitude of the current flowing in at least some of the same coils.

14. The apparatus of claim 13 wherein the means for indicating the pressure of the implement on the surface comprises means for detecting the phase of the current flowing in said same coils.

15. The apparatus of claim 12 wherein the means for indicating the pressure of the implement on the surface comprises means for detecting the phase of the current flowing in the coils.

16. The apparatus of claim 15 wherein the means for indicating the pressure of the implement on the surface for a particular location comprises means for detecting the same coil having the greatest change in AC current flowing therein in response to the tuned circuit interacting with the AC energy, and for monitoring the phase of the current flowing only in the detected same coil.

17. The apparatus of claim 12 wherein at least some of the coils are excited during a first interval with the AC energy at the predetermined frequency, and the indication of the implement position and the pressure of the implement on the surface is derived with responding to energy coupled back to said same coils from the tuned circuit during a second interval while none of the coils are excited by the AC energy at the predetermined frequency.

18. The apparatus of claim 17 wherein the means for indicating the pressure of the implement on the surface comprises means for detecting the phase of the current flowing in at least some of the same coils during the second interval.

19. The apparatus of claim 18 wherein the phase detecting means comprises first and second phase detectors having first inputs responsive to a source of the AC energy having a phase $\phi r$ at the predetermined frequency and second inputs responsive to a replica of the energy having a phase $\phi c$ at the predetermined frequency coupled back to said same coils during the second interval, the phase detectors being arranged so that the phases indicated by outputs of the first and second phase detectors are respectively related by $\pm(\phi r - \phi c)$ and $\pm(\phi r - \phi c \pm 90°)$.

20. In combination
a tablet;
an AC energy source;
an implement for movement on a surface of the tablet, the implement including a tuned circuit with a predetermined resonant frequency and a pressure responsive reactance connected in circuit with the tuned circuit, the pressure responsive reactance having a value that changes as a function of the pressure of the implement on the surface, the tablet including coils arranged in two coordinate directions of the surface;
means for sequentially exciting at least some of the coils to the AC energy source, the AC energy source having approximately the same frequency as the resonant frequency, the tuned circuit interacting with the AC energy supplied to the coils to change the AC current flowing in at least some of the coils so the AC current change at the resonant frequency in at least some of the coils arranged in the two coordinate directions designates the implement position on the tablet and the pressure of the implement on the surface, the AC current change designating the implement position on the tablet and the pressure of the implement on the surface being derived from the same coils of the tablet; and
means responsive to the AC current changes flowing in said same coils that designate the implement position on the tablet and the pressure of the implement on the surface for indicating the implement position and the pressure of the implement on the surface at positions indicated by the implement on the surface.

21. The combination of claim 20 wherein the means for indicating the implement position comprises means for detecting the amplitude of the current flowing in at least some of the same coils.

22. The combination of claim 20 wherein the means for indicating the pressure of the implement on the surface comprises means for detecting the phase of at least some of the current flowing in the same coils.

23. The combination of claim 21, wherein the means for indicating the implement position comprises means for detecting the amplitude of the current change in the same coil having the greatest change and the amplitudes of the current change in the coils adjacent the same coil having the greatest change, and for interpolating between the values of the amplitudes of the current change between the same coil having the greatest change and the same coils adjacent thereto.

24. The combination of claim 23 wherein the means for connecting connects the AC energy source to at least some of the coils during a first interval and the means for indicating the implement position and the pressure of the implement on the surface responds to energy coupled back to said same coils from the tuned circuit during a second interval while none of the coils are excited by the AC energy at the predetermined frequency.

25. The combination of claim 20 wherein the means for indicating the width of the line comprises means for detecting the phase of the current flowing in at least some of the same coils.

26. The combination of claim 25 wherein the means for indicating the width of the line for a particular location comprises means for detecting the same coil having the greatest change in AC current flowing therein in response to the tuned circuit interacting with the AC energy, and for monitoring the phase of the current flowing only in the detected coil.

27. The combination of claim 20, wherein at least some of the coils are excited during a first interval with the AC energy at the predetermined frequency, and the indication of the implement position and the pressure of the implement on the surface is derived by responding to energy coupled back to said same coils from the tuned circuit during a second interval while none of the coils are excited by the AC energy at the predetermined frequency.

28. A coordinate input system comprising:
a tablet including a first coil assembly having a multiplicity of juxtaposed coils arranged along a first direction, and a second coil assembly having a multiplicity of juxtaposed coils arranged along a second direction;
an input implement adapted to be applied with pressure against said tablet having a tuning circuit tuned to a frequency which varies around a predetermined central frequency depending on the pressure with which said input implement contacts said tablet;
first direction selection means for successively selecting one of the coils of said first direction coil assembly;
second direction means for successively selecting one of the coils of said second direction coil assembly;
means for generating an A.C. reference wave having a frequency substantially equal to said predetermined frequency;
signal detection means for detecting the A.C. signal of said predetermined frequency;
connection change-over means for alternatively connecting said A.C. reference wave and said signal detection means successively to said coils of said first and second coil assemblies selected by said first and second direction selection means; and
means responsive to the A.C. signals derived from said first and second direction coils and coupled to said signal detection means by said connection change-over means for determining the position and pressure of the input implement on said tablet.

29. The coordinate input system of claim 28, wherein the position on said tablet to which said input implement contacts is represented by a coordinate point having a size which correspondingly varies with the detected change in phase of the tuned frequency.

30. The coordinate input system of claim 28 wherein the means for determining pressure includes means for detecting the phase of the AC signals derived from said first and second direction coils relative to the phase of the AC reference wave.

* * * * *